(12) United States Patent
Washam et al.

(10) Patent No.: US 8,576,698 B2
(45) Date of Patent: Nov. 5, 2013

(54) CONNECTIVITY FAULT MANAGEMENT TIMEOUT PERIOD CONTROL

(75) Inventors: Benjamin D. Washam, Ottawa (CA); Lei Qiu, San Ramon (CA); Xiaomei Han, Kanata (CA)

(73) Assignee: Alcatel Lucent, Paris (FR)

( * ) Notice: Subject to any disclaimer, the term of this patent is extended or adjusted under 35 U.S.C. 154(b) by 456 days.

(21) Appl. No.: 12/635,265

(22) Filed: Dec. 10, 2009

(65) Prior Publication Data

US 2011/0141911 A1 Jun. 16, 2011

(51) Int. Cl.
*G06F 11/07* (2006.01)
(52) U.S. Cl.
USPC .......................................... 370/216; 370/229
(58) Field of Classification Search
USPC .............. 370/216, 217, 221, 225, 229–230.1, 370/242, 254
See application file for complete search history.

(56) References Cited

U.S. PATENT DOCUMENTS

| | | | | |
|---|---|---|---|---|
| 6,526,433 | B1* | 2/2003 | Chang et al. | 709/201 |
| 6,880,013 | B2* | 4/2005 | Kashyap | 709/227 |
| 7,848,337 | B1* | 12/2010 | Weng et al. | 370/401 |
| 7,957,295 | B2* | 6/2011 | Varma et al. | 370/241 |
| 2004/0053578 | A1* | 3/2004 | Grabon et al. | 455/73 |
| 2006/0047687 | A1* | 3/2006 | Dearing et al. | 707/102 |
| 2006/0109807 | A1* | 5/2006 | Lee | 370/315 |
| 2007/0223493 | A1 | 9/2007 | Sridhar et al. | |
| 2008/0002576 | A1* | 1/2008 | Bugenhagen et al. | 370/229 |
| 2008/0049927 | A1* | 2/2008 | Wiley et al. | 379/230 |
| 2009/0279441 | A1* | 11/2009 | Wong et al. | 370/242 |
| 2010/0061252 | A1* | 3/2010 | Kini et al. | 370/248 |
| 2011/0096670 | A1* | 4/2011 | Cheng et al. | 370/241.1 |

FOREIGN PATENT DOCUMENTS

EP 1940078 A1 9/2007
WO WO 2004008718 A2 * 1/2004

OTHER PUBLICATIONS

International Preliminary Report on Patentability PCT/US2010/058686 dated Dec. 10, 2009.

* cited by examiner

*Primary Examiner* — Michael Thier
*Assistant Examiner* — Curtis A Alia
(74) *Attorney, Agent, or Firm* — Kramer & Amado P.C.

(57) ABSTRACT

Various exemplary embodiments relate to a method and related system and machine-readable medium including one or more of the following: receiving, at the MEP, a connectivity fault management (CFM) message; determining whether the CFM message includes an indication specifying a new value for a timeout factor; and when the CFM message includes an indication specifying a new value for the timeout factor, using the new value as the timeout factor. One or more of the following may also be included: when the CFM message does not include an indication specifying a new timeout factor, using a default value as the timeout factor; determining a timeout period using at least the timeout factor; determining whether the timeout period has elapsed since a most recent CFM message was received; and when the timeout period has elapsed since the last CFM message was received, determining that a timeout has occurred.

20 Claims, 4 Drawing Sheets

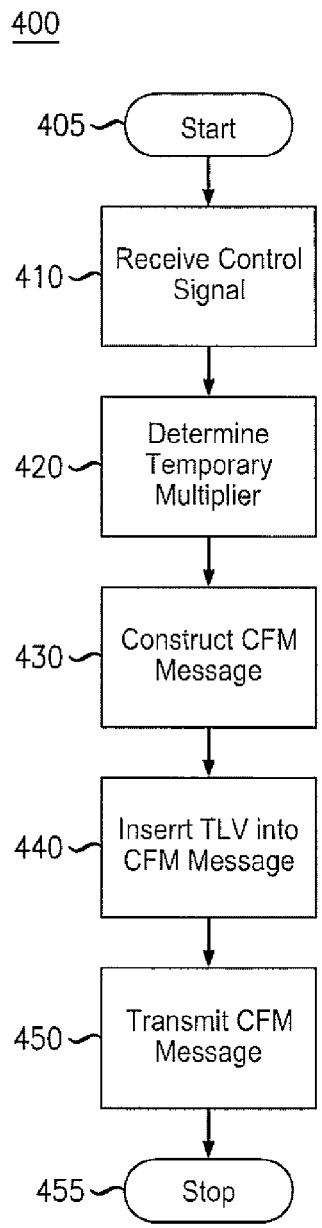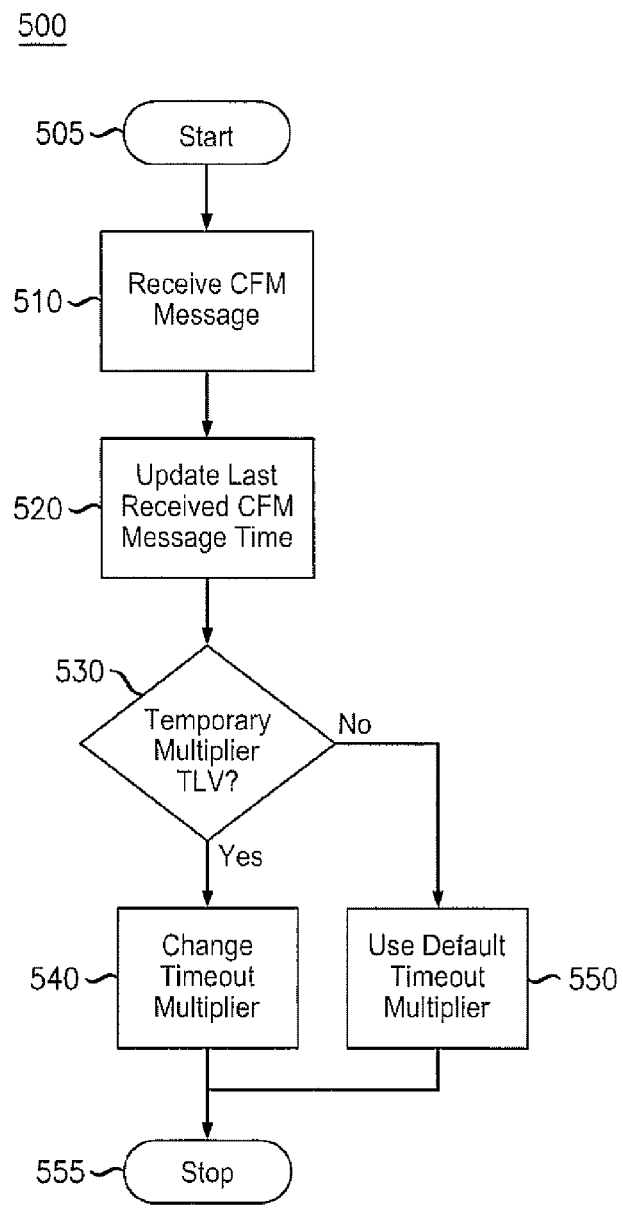
FIG. 4
FIG. 5

CONNECTIVITY FAULT MANAGEMENT TIMEOUT PERIOD CONTROL

TECHNICAL FIELD

Various exemplary embodiments disclosed herein relate generally to Operations, Administration, and Maintenance (OAM).

BACKGROUND

Traditional Local Area Networks (LANs) exchange data using Ethernet, a frame-based standard that allows high-speed transmission of data over a physical line. Since its initial implementation, the Ethernet standard has rapidly evolved and currently accommodates in excess of 10 Gigabits/second. Furthermore, because Ethernet is widely used, the hardware necessary to implement Ethernet data transfers has significantly reduced in price, making Ethernet a preferred standard for implementation of enterprise-level networks.

Given these benefits, telecommunications service providers have sought to expand the use of Ethernet into larger-scale networks, often referred to as Metropolitan Area Networks (MANs) or Wide Area Networks (WANs). By implementing so-called Carrier Ethernet, service providers may significantly increase the capacity of their networks at a minimal cost. This increase in capacity, in turn, enables provider networks to accommodate the large volume of traffic necessary for next-generation applications, such as Voice over Internet Protocol (VoIP), IP Television (IPTV), and Video On Demand (VoD).

Because Ethernet evolved in the context of local area networks, however, native Ethernet has a number of limitations when applied to larger scale networks. One key deficiency is the lack of native support for Operation and Maintenance (OAM) functionality. More specifically, because network operators can typically diagnose problems in a LAN on-site, the Ethernet standard lacks support for remote monitoring of connections and performance. Without support for such remote monitoring, network operators of large-scale networks would find it difficult, if not impossible, to reliably maintain their networks.

To address the lack of native Connectivity Fault Management (CFM) in the Ethernet standard, several organizations have developed additional standards describing this functionality. In particular, the International Telecommunication Union (ITU) has published Y.1731, entitled, "OAM Functions and Mechanisms For Ethernet-Based Networks," the entire contents of which are hereby incorporated by reference. Similarly, the Institute of Electrical and Electronics Engineers (IEEE) has published 802.1ag, entitled "Connectivity Fault Management," the entire contents of which are hereby incorporated by reference.

Y.1731 and 802.1ag describe a number of mechanisms used to detect, isolate, and remedy defects in Ethernet networks. Some of these mechanisms include the establishment of a Maintenance Association (MA) comprising at least two Maintenance Endpoints (MEPs) configured on different network nodes. The MEPs within an MA are typically fully meshed, meaning that any MEP may communicate with any other MEP within the MA. MEPs within an MA work together to monitor the connections between them. For example, each MEP may periodically transmit a Continuity Check Message (CCM) to other MEPs within the MA, thereby informing the network nodes within the MA of an individual node's status. Additionally, the receipt of a CCM by a MEP inherently affirms that the connection between the sending and receiving MEPs remains sufficiently intact.

Y.1731 provides seven possible intervals for CCM transmission ranging from 3.33 milliseconds to 10 minutes. A MEP will attempt to transmit one CCM to each MEP within the MA per transmission interval. At the same time, each MEP monitors received CCMs in order to detect any problems with the other network nodes or connections thereto. Y.1731 states that if a MEP has not received a CCM within a timeout period of 3.5 times the transmission interval (i.e., if there has been a loss of three consecutive CCMs), the MEP should declare a network fault and take remedial action such as, for example, rerouting traffic.

Not all instances of a MEP not receiving expected CCMs are indicative of network failure, however. For example, during a software upgrade of the control plane of a network node, a MEP on the network node may not transmit any CCMs even though the forwarding plane continues to operate as normal. In such cases, while there is no actual network failure, any connected MEPs would likely falsely declare a network failure. These MEPs may then proceed to waste resources in an attempt to cope with the non-existent network failure. In other cases, a temporary interruption in service may be anticipated such as in the case of, for example, a reset of the network node. Here, because the interruption is known to be temporary, it may be undesirable to declare a network fault.

Y.1731 and 802.1ag further describe other periodic messages, such as the Alarm Indication Signal (AIS). A MEP may transmit an AIS periodically to suppress any alarms that may be raised by other MEPs at a higher level. Again, the standards provide that after a timeout period of 3.5 times the message interval has elapsed since the receipt of the most recent AIS, a MEP should declare a timeout. Once a timeout has occurred, the peer MEPs may determine that they are free to raise alarms. As with CCMs, certain conditions, such as a software upgrade, may prevent a MEP from transmitting an AIS for a period of time. Thus, a timeout may be declared and alarms may be raised, even though the MEP may wish to continue suppressing all alarms.

In view of the foregoing, it would be desirable to avoid false or otherwise unnecessary determinations of a timeout. In particular, it would be desirable to provide connectivity fault management that is able to avoid undesirable determinations of timeouts such as, for example, during periods where a network node may temporarily stop sending periodic CFM messages to connected nodes.

SUMMARY

In view of the present need for an Operations, Administration, and Maintenance (OAM) system capable of avoiding false or otherwise unnecessary determinations of a timeout, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related network node and machine-readable medium including one or more of the following: receiving, at the Maintenance Endpoint (MEP), a connectivity fault management (CFM) message; determining whether the CFM message includes an indication specifying a new value for a timeout factor; and when the CFM message includes an indication specifying a new value for the timeout factor, using the new value as the timeout factor. Various exemplary embodiments further include one or more of the following: when the CFM message does not include an indication specifying a new timeout factor, using a default value as the timeout factor; determining a timeout period using at least the timeout factor; determining whether the timeout period has elapsed since a most recent CFM message was received; and when the timeout period has elapsed since the last CFM message was received, determining that a timeout has occurred.

It should be apparent that, in this manner, various exemplary embodiments enable the temporary modification of the timeout period for periodic CFM messages. In particular, by transmitting a message to peer MEPs indicating a new timeout multiplier, or other timeout factor, the timeout period for periodic CFM messages may be temporarily lengthened to prevent the unnecessary declaration of a timeout.

BRIEF DESCRIPTION OF THE DRAWINGS

In order to better understand various exemplary embodiments, reference is made to the accompanying drawings, wherein:

FIG. 4 schematically illustrates a flowchart of an exemplary method for transmitting a message including a TLV field for temporarily changing a timeout factor;

FIG. 5 schematically illustrates a flowchart of an exemplary method for receiving and processing a message.

DETAILED DESCRIPTION

Figure 1:
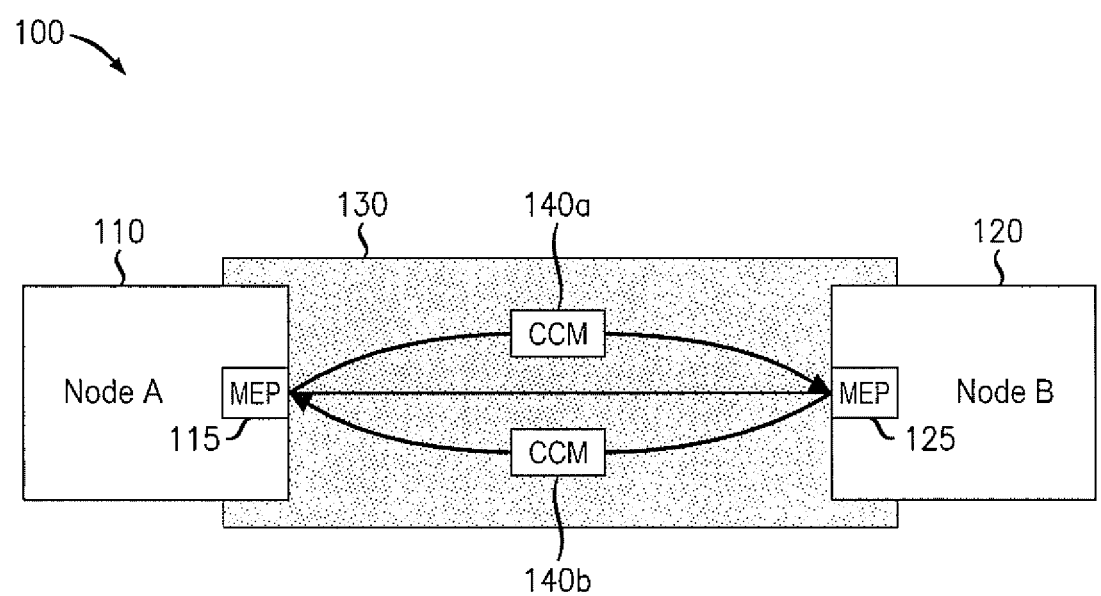
FIG. 1 schematically illustrates an exemplary network including a maintenance association (MA)

Referring now to the drawings, in which like numerals refer to like components or steps, there are disclosed broad aspects of various exemplary embodiments. It should be noted that, while this document provides examples relating to Continuity Check Messages (CCMs), the methods and systems described herein are applicable to any periodic messages including, but not limited to, Alarm Indication Signals (AISs). Further, the term "timeout factor," as used herein, refers to any value used in determining an applicable timeout period including, but not limited to, a timeout multiplier, a message interval, or the timeout period itself.

FIG. 1 schematically illustrates an exemplary network 100 including a maintenance association (MA) 130. Exemplary network 100 may include at least two network nodes, such as node A 110 and node B 120. Each network node 110, 120 may be a personal or laptop computer, a server, routing equipment, or any other device capable of providing connectivity fault management (CFM) services. Network node A 110 may include a maintenance endpoint (MEP) 115 implemented according to IEEE 802.1ag and/or ITU-T Y.1731. Likewise, network node B 120 may include a MEP 125 implemented according to IEEE 802.1ag and/or ITU-T Y.1731.

MEPs 115, 125 may belong to an MA 130 for providing CFM services. For example, MEPs 115, 125 may exchange CCMs 140a, 140b in order to ensure that each node 110, 120 is functioning properly and that the lines of communication remain established. One of the MEPs 115, 125 may declare a connectivity fault if it does not receive a CCM from the other MEP 115, 125 during a timeout period equal to a predetermined message interval times a timeout multiplier. The message interval may be virtually any value such as, for example, 3.33 milliseconds, 10 milliseconds, 100 milliseconds, 1 second, 10 seconds, 1 minute, or 10 minutes. Likewise, the timeout multiplier may be virtually any value such as, for example, 3.5, 4.5, or 10. Thus, in a system having a message interval of 1 second and a timeout multiplier of 3.5, the timeout period may be 3.5 seconds. If a MEP 115, 125 does not receive any CCM for this timeout period of 3.5 seconds, it may declare a timeout. The MEP 115, 125 may then process the timeout declaration by, in the case specific case of a CCM timeout, declaring a connectivity fault and taking remedial action such as, for example, rerouting traffic through another node.

MEPs 115, 125 may further be adapted to temporarily modify the timeout period in order to postpone the declaration of a connectivity fault or other timeout. For example, MEPs 115, 125 may transmit a message including a new timeout multiplier and/or a new interval. Further, MEPs 115, 125 may be adapted to receive such a message and temporarily change the timeout multiplier and/or interval used in determining whether a timeout has occurred. In various alternative embodiments, MEPs 115, 125 may directly specify a temporary timeout period rather than other timeout factors that are used in its determination. Accordingly, while the examples provided herein are primarily directed toward the use of temporary timeout multipliers, a person of skill in the art would recognize the modifications necessary to provide methods and systems for modifying other timeout factors such as, for example, message intervals and/or timeout periods.

Having described the components of exemplary network 100, a brief summary of the operation of exemplary network 100 will be provided. It should be apparent that the following description is intended to provide an overview of the operation of exemplary network 100 and is therefore a simplification in some respects. The detailed operation of exemplary network 100 will be described in further detail below in connection with FIGS. 2-6.

MEP 115 may first determine that the timeout period should be temporarily increased. For example, MEP 115 may receive an indication that the control plane software of node A 110 is about to be upgraded and thus determine that the timeout period should be increased in order to avoid the unnecessary declaration of a connectivity fault by MEP 125 during this process. MEP 115 may then determine a timeout multiplier of 10 should be used to allow enough time for the upgrade process to be completed. MEP 115 may then transmit a message to MEP 125 to indicate that the timeout multiplier should be temporarily changed to 10. MEP 115 may, for example, insert a Type-Length-Value (TLV) field into the header of a CCM 140a to communicate the temporary timeout multiplier. When MEP 125 receives CCM 140a, it may read this TLV field and use the value of 10 as a timeout multiplier. Thus, MEP 125 may wait for a lengthened timeout period of 10 times the message interval before declaring a connectivity fault. MEP 125 may then revert to using the default timeout period upon receipt of the next CCM that does not contain such a TLV field.

It should be apparent that other methods known to those of skill in the art may be used to communicate a temporary timeout multiplier to MEP 125. For example, MEP 115 may create and transmit a message that serves no purpose other than communicating a temporary timeout multiplier to MEP 125.

Figure 2:
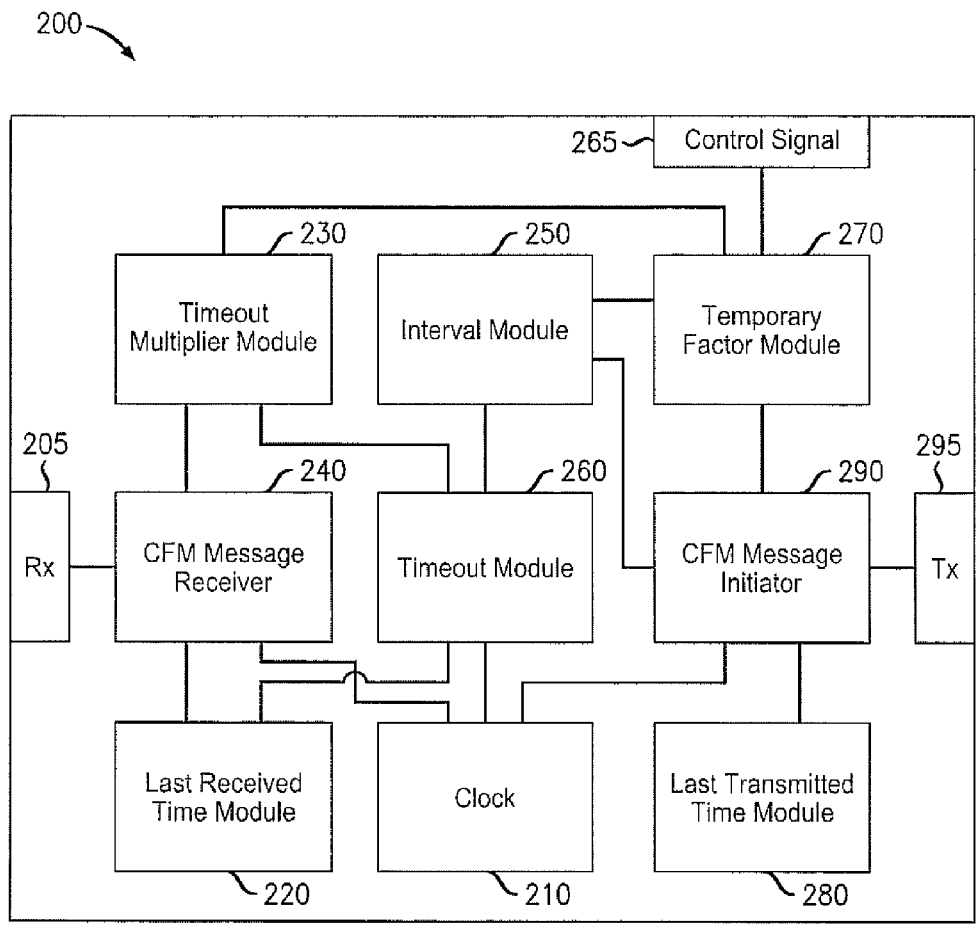
FIG. 2 schematically illustrates an exemplary node capable of providing connectivity fault management (CFM) with timeout period control.

FIG. 2 schematically illustrates an exemplary node 200 capable of providing connectivity fault management with timeout period control. Exemplary node 200 may correspond to node A 110 and/or node B 120 in exemplary network 100. Exemplary node 200 may be capable of modifying a timeout multiplier for any periodic CFM message including, but not limited to, continuity check messages (CCMs) and alarm indication signals (AISs).

Exemplary node 200 may contain a receiver interface 205, a clock 210, a last received time module 220, a timeout multiplier module 230, a CFM message receiver 240, an interval module 250, a timeout module 260, a last transmitted time module 270, a control signal interface 275, a temporary factor module 280, a CFM message initiator 290, and a transmitter interface 295. Some or all of the components of node 200 may constitute part of a MEP implemented on node 200.

Receiver interface 205 may be an interface comprising hardware and/or executable instructions encoded on a machine-readable storage medium configured to receive a CFM message from another node. For example, receiver interface 205 may receive a CCM, AIS, or other CFM message.

Clock 210 may include hardware and/or executable instructions on a machine-readable storage medium configured to measure the passing of time. Accordingly, clock 210 may be any implementation of a system clock such as, for example, a timer circuit and counter configured to keep the current Unix time. It should be apparent that any method of representing the current time may be used.

Last received time module 220 may include hardware and/or executable instructions on a machine-readable storage medium configured to store an indication of the system time at which the most recent CFM message was received by exemplary node 200. Accordingly, last received time module 220 may include a machine readable storage medium such as, for example, read-only memory (ROM), random-access memory (RAM), magnetic disk storage media, optical storage media, flash-memory devices, and similar storage media. Last received time module 220 may store a system time relating to only one type of CFM message. Alternatively, last received time module 220 may store a system time related to the most recent message received of any CFM message type of a group of CFM message types. For example, last received time module 220 may store a time indicating when node 200 received the most recent CFM message that was either a CCM or AIS. As a further alternative, last received time module 220 may store multiple times, each relevant to a different CFM message type. For example, last received time module 220 may store the system time at which the most recent CCM message was received as well as the system time at which the most recent AIS message was received.

Timeout multiplier module 230 may include hardware and/or executable instructions on a machine-readable storage medium configured to store a current timeout multiplier for use in determining whether a timeout has occurred. Accordingly, timeout multiplier module 230 may include a machine readable storage medium such as, for example, read-only memory (ROM), random-access memory (RAM), magnetic disk storage media, optical storage media, flash-memory devices, and similar storage media. Timeout multiplier module 230 may additionally store a default timeout multiplier for use when no other timeout multiplier has been specified. Timeout multiplier module 230 may store a current and default multiplier for only one CFM message type or for a group of CFM message types. Timeout multiplier module 230 may also store multiple pairs of current and default timeout multipliers for multiple CFM message types.

CFM message receiver 240 may include hardware and/or executable instructions on a machine-readable storage medium configured to process a CFM message received via receiver interface 205. For example, if CFM message receiver 240 receives a CCM, it may use the current system time, as indicated by clock 210, to replace the time stored in last received time module 220. CFM message receiver 240 may then continue to process the CCM as specified by IEEE 802.1ag and/or ITU-T Y.1731.

CFM message receiver 240 may additionally check the received CFM message to determine whether it contains an indication that the timeout multiplier should be temporarily modified. If such an indication is present, CFM message receiver may use the new multiplier indicated by the CFM message to replace the current timeout multiplier stored in timeout multiplier module 230. For example, if the CFM message is a CCM containing a TLV indicating that the timeout multiplier should be temporarily changed to 4.5, CFM message receiver 240 may set the current timeout multiplier for CCMs stored in timeout multiplier module 230 to a value of 4.5. Note that CFM message receiver 240 may refrain from modifying the default timeout multiplier, also stored in timeout multiplier module 230.

Interval module 250 may include hardware and/or executable instructions on a machine-readable storage medium configured to store an indication of a message interval being used. Accordingly, interval module 230 may include a machine-readable storage medium such as, for example, read-only memory (ROM), random-access memory (RAM), magnetic disk storage media, optical storage media, flash-memory devices, and similar storage media. Interval module 250 may store a single interval value, to be used for all period CFM messages, or multiple interval values, each value to be used for a specific CFM message type. For example, interval module 250 may store an interval of 1 second for the CCM type and an interval of 1 minute for the AIS type.

Timeout module 260 may include hardware and/or executable instructions on a machine-readable storage medium configured to determine whether a timeout has occurred for a particular CFM message type. Timeout module 260 may periodically determine the amount of time that has passed since exemplary node 200 received the most recent CFM message of a certain type by comparing a value stored in last received time module 220 to the current system time as indicated by clock 210. Timeout module 260 may also determine the applicable timeout period by multiplying the interval stored in interval module 250 by the current timeout multiplier type stored in timeout multiplier module 230. Finally, timeout module 260 may determine whether a timeout has occurred by comparing the timeout period to the amount of time that has passed since the last CFM message was received. If an amount of time greater than the timeout period has elapsed, timeout module 260 may declare a timeout for the CFM message type and exemplary node 200 may proceed to take appropriate action.

Last transmitted time module 270 may include hardware and/or executable instructions on a machine-readable storage medium configured to store an indication of the system time at which the most recent CFM message was transmitted by exemplary node 200. Accordingly, last transmitted time module 270 may include a machine readable storage medium such as, for example, read-only memory (ROM), random-access memory (RAM), magnetic disk storage media, optical storage media, flash-memory devices, and similar storage media.

Last transmitted time module 270 may store a system time relating to only one type of CFM message. Alternatively, last transmitted time module 270 may store a system time related to the most recent message transmitted of any CFM message type of a group of CFM message types. For example, last transmitted time module 270 may store a time indicating when node 200 transmitted the most recent CFM message that was either a CFM or AIS. As a further alternative, last transmitted time module 270 may store multiple times, each relevant to a different CFM message type. For example, last transmitted time module 270 may store the system time at which the most recent CCM message was transmitted as well as the system time at which the most recent AIS message was transmitted.

Control signal interface 275 may be an interface comprising hardware and/or executable instructions encoded on a machine-readable storage medium configured to receive a signal indicating the presence of one or more of a plurality of conditions. For example, control signal interface 265 may receive an indication that the control plane software for exemplary node 200 is about to be upgraded and/or and indication that exemplary node 200 is about to be restarted. Such indication may take any form known in the art such as, for example, a packet or a simple signal asserted on an input of control signal interface 265.

Temporary factor module 280 may include hardware and/or executable instructions on a machine-readable storage medium configured to determine whether the timeout multiplier for the MA should be temporarily modified. Temporary factor module 270 may receive an indication of a particular condition from control signal interface 265 and determine that the timeout multiplier should be temporarily increased to avoid an unnecessary declaration of a connectivity fault. Temporary factor module 270 may then determine an appropriate value for a temporary timeout multiplier. Any method known to those of skill in the art may be used to determine the value of the new timeout multiplier. For example, the new timeout multiplier may be a predetermined value or temporary factor module 270 may use the value of the default timeout multiplier, the value of the interval, and/or the specific condition indicated via control signal interface 265 to calculate or otherwise determine an appropriate value for the new timeout multiplier.

CFM message initiator 290 may include hardware and/or executable instructions on a machine-readable storage medium configured to construct and transmit CFM messages to other nodes via transmitted interface 295. CFM message initiator may monitor the amount of time that has passed since the most recent CFM message of a particular type was transmitted by comparing the value stored by the last transmitted time module 270 with the current system time as indicated by clock 210. Then, by comparing the amount of time that has passed to the message interval stored by interval module 250, CFM message initiator 290 may determine whether a new CFM message should be transmitted. If a new CFM message should be transmitted, CFM message initiator 290 may construct an appropriate CFM message and transmit it via transmitter interface 295.

CFM message initiator 290 may be further adapted to request a temporary modification of the timeout multiplier used by the MA. When the temporary factor module 280 has determined that the timeout multiplier should be modified, CFM message initiator 290 may construct a CFM message that includes a TLV field specifying the new value for the timeout multiplier. Alternatively, CFM message initiator 290 may wait for the next CFM message to be constructed according to the normal operation of CFM message initiator 290 in connection with the message interval and simply insert the TLV field into the CFM message before it is transmitted via transmitter interface 295.

Transmitter interface 295 may be an interface comprising hardware and/or executable instructions encoded on a machine-readable storage medium configured to transmit a CFM message to another node. For example, transmitter interface 295 may transmit a CCM, AIS, or other CFM message.

In various alternative embodiments, exemplary node 200 may use counters instead of timestamps in order to determine the amount of time that has passed since the last CFM message was transmitted and received. For example, last received time module 220 and last transmitted time module 270 may each include a counter that is reset to a value of zero whenever exemplary node 200 receives or transmits a CFM message, respectively. Last received time module 220 and last transmitted time module 270 may then increase this counter value at the rate of clock 210 to keep track of the passage of time. As a further alternative, last received time module 220 and last transmitted time module 270 may set a counter equal to the message interval or the message interval times the timeout multiplier whenever exemplary node 200 receives or transmits a CFM message, respectively. Last received time module 220 and last transmitted time module 270 may then decrease this counter value at the rate of clock 210. Thus, the functionality of tracking the passage of time may be accomplished according to any method known to those of skill in the art.

Figure 3:
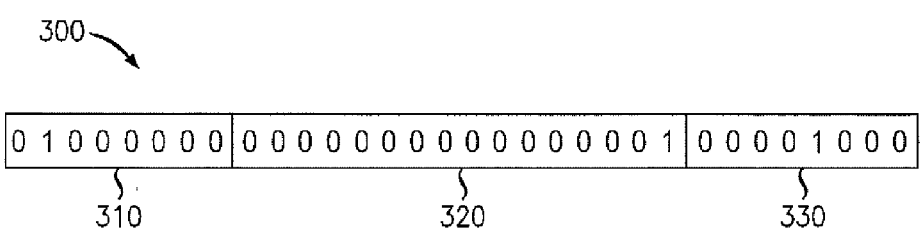
FIG. 3 schematically illustrates an exemplary type-length-value (TLV) field for modifying a timeout factor used by an MA.

FIG. 3 schematically illustrates an exemplary type-length-value (TLV) field 300 for use in a CFM message header. TLV field 300 may be used to indicate a new value for a timeout multiplier to be used in an MA. TLV field 300 may include a type subfield 310, a length subfield 320, and a value subfield 330.

Type subfield 310 may be used to indicate that TLV field 300 carries a new value for the timeout multiplier. Any value that does not correspond to an already-defined type may be used, so long as all MEPs within an MA agree on the meaning of the value. As an example, type subfield 310 carries a value of "01000000," indicating type number 64. In this example, type number 64 may be used by the MA to indicate that TLV field 300 carries a new value for the timeout multiplier. The length subfield 320 may be used to indicate the length, in octets, of the value subfield 330. As an example, length subfield 320 carries a value of "0000000000000001," indicating that value subfield 330 is one octet in length.

The value subfield 330 may be used to indicate the value of the temporary timeout multiplier. This value may be expressed in any manner known to those of skill in the art. For example, the value may be expressed as an integer number in binary or a floating point number formatted according to a standard such as IEEE 754. Other, non-standardized models may be used as well, such as a binary number representing an integer that is two times the temporary timeout multiplier. As an example, value subfield 330 carries a value of "00001001," or 9, and may represent a temporary timeout multiplier of 4.5, since 4.5 is half of 9.

FIG. 4 schematically illustrates a flowchart of an exemplary method 400 for transmitting a connectivity fault management message including a TLV field for temporarily changing a timeout multiplier. Method 400 may be performed, for example, by the components of exemplary node 110.

Method 400 may start in step 405 and proceed to step 410, where exemplary node 110 may receive a control signal indicating the presence of a condition such as, for example, an imminent restart or software upgrade. Method 400 may then proceed to step 420, where node 110 may determine a timeout multiplier to be temporarily used by the MA 140. Node 110 may take into account such information as, for example, what condition prompted the need for a temporary timeout multiplier, the value of the default timeout multiplier, and the current message interval. Once node 110 has determined the value for the new timeout multiplier, method 400 may proceed to step 430.

In step 430, node 110 may construct a new CFM message for transmission toward the other MEPs within the MA. This CFM message may be any CFM message appropriate for carrying the indication that a new timeout multiplier is to be used. For example, the CFM message may be a CCM or an AIS message. Method 400 may then proceed to step 440, where node 110 may insert a TLV field into the newly constructed CFM message. This TLV field may carry a type code that indicates that the TLV field carries a temporary timeout multiplier. Further, the TLV field may carry a value that indicates the timeout multiplier determined in step 420. Method 400 may then proceed to step 450, where node 110 may transmit the CFM message to the other MEPs within the MA, and then to step 455, where the method 400 may end.

FIG. 5 schematically illustrates a flowchart of an exemplary method 500 for receiving and processing a connectivity fault management message. Method 500 may be performed, for example, by the components of exemplary node 120.

Method 500 may begin in step 505 and proceed to step 510, where node 120 may receive a CFM message from another MEP within the MA. Method 500 may then proceed to step 520, where node 120 may update a value indicating the time at which the most recent CFM message was received to reflect the receipt of the CFM message. Method 500 may then proceed to step 530, where node 120 may determine whether the CFM message includes a TLV value indicating that a temporary timeout multiplier should be used for the MA. Node 120 may accomplish this by, for example, examining the type subfield of each TLV field included in the header of the CFM message to determine whether any TLV field is of the type predefined by the MA 140 to carry a temporary timeout multiplier.

If the CFM message includes a temporary timeout multiplier TLV field, method 500 may proceed to step 540, where node 120 may change the current timeout multiplier to the value carried by the temporary timeout multiplier TLV field. Method 500 may then end in step 555. If, however, in step 530, node 120 determines that the CFM message does not carry a temporary timeout multiplier TLV, method 500 may proceed to step 550. In step 550, node 120 may ensure that the current timeout multiplier is equal to the default timeout multiplier. Method 500 may then end in step 555.

Figure 6:
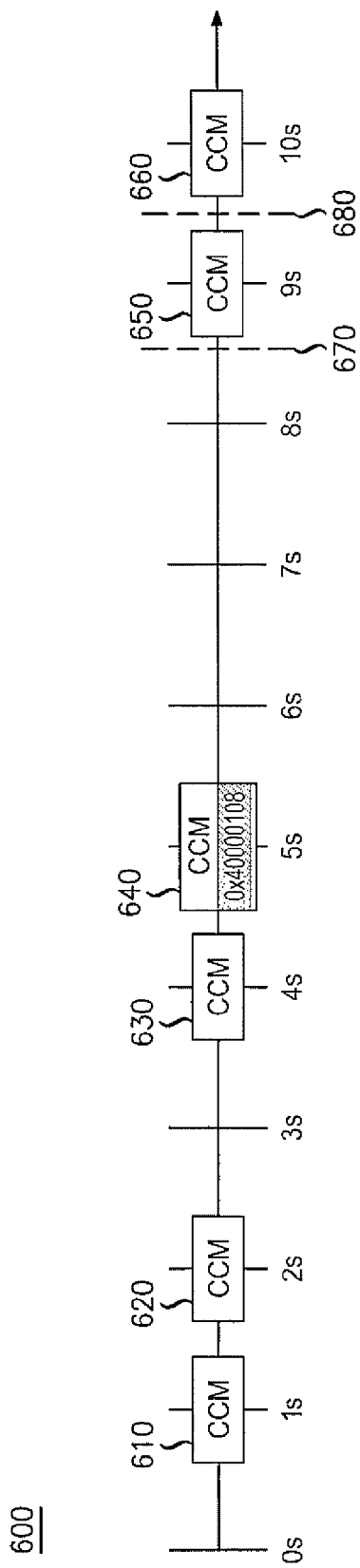
FIG. 6 schematically illustrates an exemplary message exchange within an MA.

FIG. 6 schematically illustrates an exemplary message exchange 600 within a maintenance association. Message exchange 600 may illustrate a number of CCMs 610, 620, 630, 640, 650, 660 sent from one MEP, such as MEP 115, to at least one peer MEP, such as MEP 125. Message exchange 600 may occur within an MA having a message interval of 1 second and a default timeout multiplier of 3.5. Thus, the default timeout period for the MA may be equal to 3.5 times 1 second, or 3.5 seconds.

After the first one-second interval has elapsed, MEP 115 may transmit a first CCM 610. Likewise, after the second one-second interval, MEP 115 may transmit a second CCM 620. Accordingly, MEP 125 may not declare a connection fault because CCMs 610, 620 have been received at the expected interval of 1 second.

MEP 115 may further transmit a third CCM 630 two seconds later, at the 4 s mark. This may be due to a delay in transmission by MEP 115 or a dropped CCM (not shown) intended for transmission between that of CCM 620 and CCM 630. However, MEP 125 may still refrain from declaring a connectivity fault because CCM 630 was received before the timeout period of 3.5 seconds elapsed.

At this point, MEP 115 may receive an indication that the timeout multiplier should be temporarily modified. This may be, for example, an indication that Node A 110 is about to be upgraded or restarted. Accordingly, MEP 115 may transmit a CCM 640 that includes a TLV field indicating that the timeout multiplier should be temporarily modified. For example, CCM 640 may include TLV field 300, represented in hexadecimal as "0x40000108," thus indicating that the timeout multiplier should be temporarily set to 4.5. Upon receipt of this CCM 640, MEP 125 may temporarily change the current timeout multiplier to 4.5. Thus, the timeout period is increased from 3.5 seconds to 4.5 seconds and the point at which a timeout would be declared by MEP 125 if it were to receive no further CCMs is moved from line 670 to line 680.

MEP 115 may send another CCM 650 four seconds later, at the 9 s mark. Here, it is apparent that had MEP 115 not transmitted CCM 640 with the temporary timeout multiplier TLV field, a timeout would have been declared at line 670. Since the timeout multiplier had been increased, however, MEP 125 may have refrained from declaring a timeout. Upon receipt of CCM 650, MEP 125 may return to using the default value for the timeout multiplier. MEP 115 may then continue to transmit further CCMs 660 at regular intervals.

According to the foregoing, various exemplary embodiments provide for a method and system for avoiding the undesirable declaration of a timeout. In particular, by providing a means for increasing the timeout period before the occurrence of a foreseen event, a MEP may inform peer MEPs within its MA that more time should be allotted when waiting for the next periodic message. In this manner, MEPs within an MA may work to avoid undesirable timeouts.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A system for modifying a timeout period observed by a peer system, the system comprising:
    a temporary factor module configured to, based on an indication of a future event that will render the system temporarily unavailable, determine a new value for a timeout factor to transmit to the peer system;
    a connectivity fault management (CFM) message initiator configured to, when the temporary factor module has determined a value for the new timeout factor, construct a new CFM message that includes an indication specifying the new value for the timeout factor, and
    a transmitter interface configured to transmit the new CFM message to the peer system for use in modifying a CFM message timeout period,
    wherein the new CFM message instructs the peer system to refrain from declaring a timeout while the system is temporarily unavailable due to the future event by modifying the CFM message timeout period.

2. The system of claim 1, further comprising:
    a control signal interface configured to receive a control signal including the indication of the future event that will render the system temporarily unavailable.

3. The system of claim 2, wherein the temporary factor module is further configured to determine the new timeout factor to transmit to the peer system based on information carried by the control signal.

4. The system of claim 1, wherein the indication of the new value for the timeout factor is a Type-Length-Value (TLV) field.

5. The system of claim 1, wherein the CFM message comprises at least one of: a continuity check message and an alarm indication signal.

6. The system of claim 1, wherein the timeout factor comprises at least one of: a timeout multiplier and a message interval.

7. The system of claim 1, wherein the CFM message initiator is further configured to, after occurrence of the future event, transmit an additional CFM message that omits the indication of the new value for the timeout factor.

8. The system of claim 1 wherein the future event is at least one of: a software upgrade and a server restart.

9. A method performed by a maintenance endpoint (MEP) configured on a node in a communications network for modifying a timeout period used by a peer MEP in determining whether a timeout has occurred, the method comprising:
    determining that a future event will render the MEP temporarily unavailable;
    determining, based on the future event, a new value for a timeout factor to transmit to the peer MEP;
    constructing a new connectivity fault management (CFM) message that includes an indication specifying the new value for the timeout factor; and
    transmitting the new CFM message to the peer MEP,
    wherein the new CFM message instructs the peer MEP to refrain from declaring a timeout while the system is temporarily unavailable due to the future event by modifying a CFM message timeout period.

10. The method of claim 9, wherein the indication is a Type-Length-Value (TLV) field.

11. The method of claim 9, wherein the timeout factor includes at least one of: a timeout multiplier and a message interval.

12. The method of claim 9, further comprising:
    after the occurrence of the future event, transmitting an additional CFM message that omits the indication of the new value for the timeout factor.

13. The method of claim 9, wherein the MEP is implemented according to at least one of: the IEEE 802.1ag standard and the ITU-T Y.1731 standard.

14. The method of claim 9, wherein the future event is at least one of: a software upgrade and a server restart.

15. A non-transitory machine-readable storage medium encoded with instructions for execution by a maintenance endpoint (MEP) for modifying a timeout period used by a peer MEP in determining whether a timeout has occurred, the non-transitory machine-readable storage medium comprising:
    instructions for determining that a future event will render the MEP temporarily unavailable;
    instructions for determining, based on the future event, a new value for a timeout factor to transmit to the peer MEP;
    instructions for constructing a new connectivity fault management (CFM) message that includes an indication specifying the new value for the timeout factor; and
    instructions for transmitting the new CFM message to the peer MEP,
    wherein the new CFM message instructs the peer MEP to refrain from declaring a timeout while the system is temporarily unavailable due to the future event by modifying a CFM message timeout period.

16. The non-transitory machine-readable storage medium of claim 15, wherein the indication is a Type-Length-Value (TLV) field.

17. The non-transitory machine-readable storage medium of claim 15, wherein the timeout factor includes at least one of: a timeout multiplier and a message interval.

18. The non-transitory machine-readable storage medium of claim 15, further comprising:
    instructions for, after the occurrence of the future event, transmitting an additional CFM message that omits the indication of the new value for the timeout factor.

19. The non-transitory machine-readable storage medium of claim 15, wherein the MEP is implemented according to at least one of: the IEEE 802.1ag standard and the ITU-T Y.1731 standard.

20. The non-transitory machine-readable storage medium of claim 15, wherein the future event is at least one of: a software upgrade and a server restart.

* * * * *